US008768969B2

(12) United States Patent
Huerta et al.

(10) Patent No.: US 8,768,969 B2
(45) Date of Patent: Jul. 1, 2014

(54) METHOD AND SYSTEM FOR EFFICIENT REPRESENTATION, MANIPULATION, COMMUNICATION, AND SEARCH OF HIERARCHICAL COMPOSITE NAMED ENTITIES

(75) Inventors: Juan Manuel Huerta, New York City, NY (US); David Lubensky, Brookfield, CT (US); Thiruvilwamalai Venkatraman Raman, San Jose, CA (US); Charles Francis Wiecha, Hastings-on-Hudson, NY (US)

(73) Assignee: Nuance Communications, Inc., Burlington, MA (US)

( * ) Notice: Subject to any disclaimer, the term of this patent is extended or adjusted under 35 U.S.C. 154(b) by 1004 days.

(21) Appl. No.: 10/886,571

(22) Filed: Jul. 9, 2004

(65) Prior Publication Data
US 2006/0010138 A1    Jan. 12, 2006

(51) Int. Cl.
*G06F 17/30* (2006.01)
(52) U.S. Cl.
CPC .............................. *G06F 17/30401* (2013.01)
USPC .......................................... 707/797; 707/804
(58) Field of Classification Search
USPC .......................................... 707/797; 704/246
See application file for complete search history.

(56) References Cited

U.S. PATENT DOCUMENTS

| | | | | |
|---|---|---|---|---|
| 4,974,191 A | * | 11/1990 | Amirghodsi et al. | 704/8 |
| 5,386,556 A | * | 1/1995 | Hedin et al. | 707/4 |
| 5,721,938 A | * | 2/1998 | Stuckey | 704/4 |
| 5,815,639 A | * | 9/1998 | Bennett et al. | 704/235 |
| 6,272,455 B1 | * | 8/2001 | Hoshen et al. | 704/1 |
| 6,778,970 B2 | * | 8/2004 | Au | 706/55 |
| 2002/0010715 A1 | * | 1/2002 | Chinn et al. | 707/514 |
| 2002/0046018 A1 | * | 4/2002 | Marcu et al. | 704/9 |
| 2002/0052747 A1 | * | 5/2002 | Sarukkai | 704/270 |
| 2002/0123891 A1 | * | 9/2002 | Epstein | 704/235 |
| 2003/0115289 A1 | * | 6/2003 | Chinn et al. | 709/219 |
| 2003/0212698 A1 | * | 11/2003 | Mani et al. | 707/102 |
| 2005/0165607 A1 | * | 7/2005 | Di Fabbrizio et al. | 704/256 |

\* cited by examiner

*Primary Examiner* — Robert Beausoliel, Jr.
*Assistant Examiner* — Nirav K Khakhar
(74) *Attorney, Agent, or Firm* — Wolf, Greenfield & Sacks, P.C.

(57) ABSTRACT

A method for managing dialogue interaction includes generating a hierarchical tree representation of a set of hierarchical data entities, and identifying a leaf node in the hierarchical tree representation. A system for managing dialogue interaction includes a hierarchical data format having a plurality of hierarchical data entities, and a dialogue interaction manager that manages a dialogue with a user based upon the hierarchical data format.

18 Claims, 6 Drawing Sheets

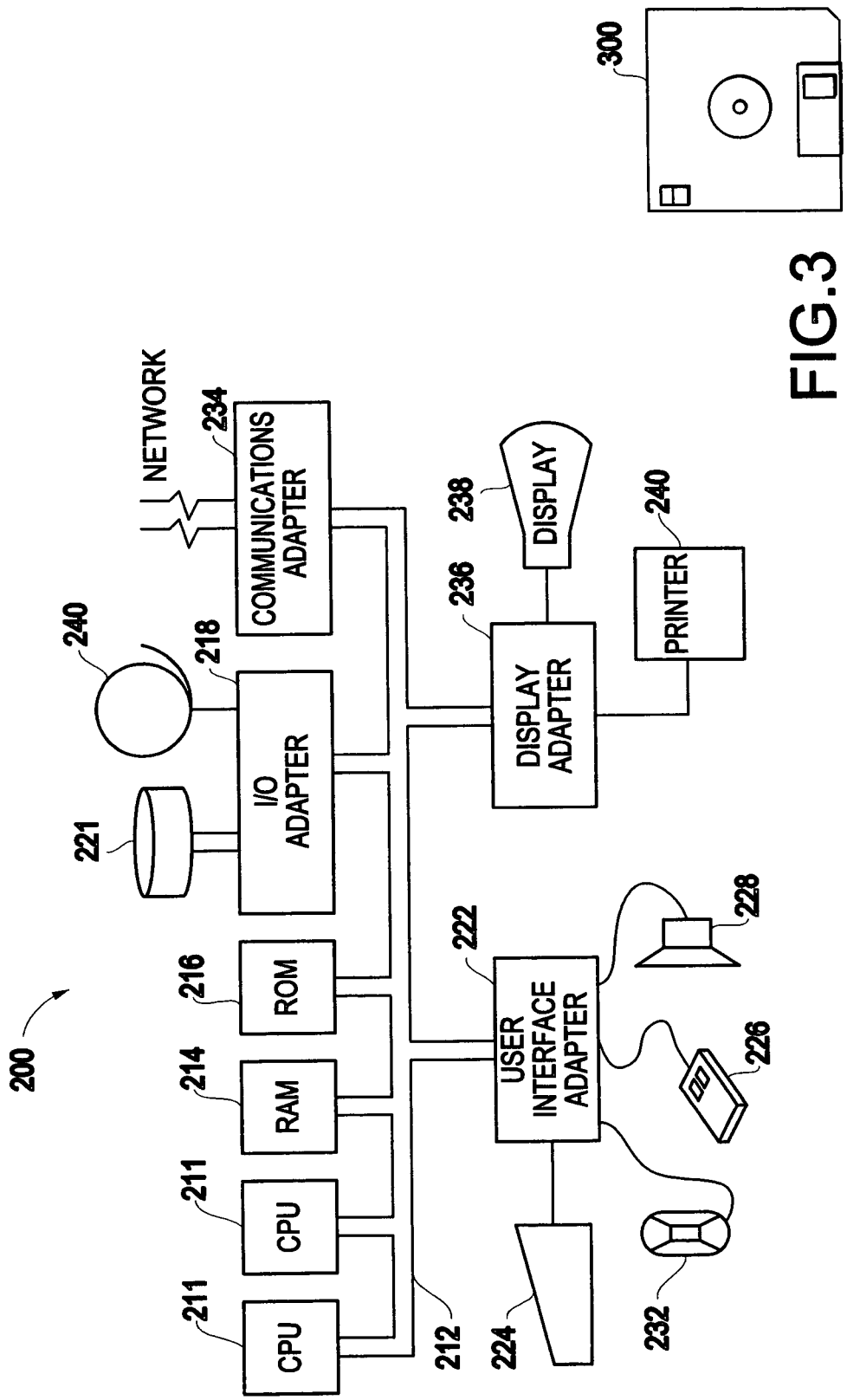

METHOD AND SYSTEM FOR EFFICIENT REPRESENTATION, MANIPULATION, COMMUNICATION, AND SEARCH OF HIERARCHICAL COMPOSITE NAMED ENTITIES

BACKGROUND OF THE INVENTION

1. Field of the Invention

The present invention generally relates to systems and methods for efficiently representing, manipulating, communicating, and searching hierarchical composite named entities. In particular, the present invention relates to a system and method for creating a tree representation of hierarchically related data, as well as, to systems and methods for manipulating and searching using a hierarchical tree representation.

2. Description of the Related Art

Conventional speech and natural language understanding systems are greatly limited by the grammars and models of the speech data that are used by such systems. The grammars are used for both recognition of speech and for use in labeling of data. The types of grammars that are typically used are of two types: simple and complex. A simple grammar is a simple enumeration of entities while a complex grammar is an enumeration of a space of values of complex entities.

SUMMARY OF THE INVENTION

A problem for these conventional speech and natural language understanding systems is that, when they use a simple grammar, any interaction with the user that involves resolving ambiguities is often lengthy and complicated.

Natural language understanding systems are often called upon to capture data from a user that is a hierarchical data type. For example, a natural language understanding system may be written to identify a specific airport based upon a user's input. A natural language understanding system that relies upon a simple grammar to identify the airport requires a specific number of interactions to determine (i.e., to "disambiguate") the user's input into a specific airport identifier. Such a system would require the user/system interaction to start broadly, such as by identifying a state in which the airport is located, and successively narrow down the location, such as by identifying a county within the identified state, then a city/town, et. seq.

In this instance, a simple grammar is required to recognize each of the fifty states, another simple grammar is required to recognize each county within each recognized state, yet another simple grammar is required to recognize each city/town within each recognized county, et. seq.

It is very difficult and labor intensive to write such a large number of simple grammars because the number of simple grammars that may be required grow significantly as each particular airport is added to the list of possible airports that may be recognized.

A problem for these conventional speech and natural language understanding systems when they use a complex grammar is that a complex grammar is very manually intensive and laborious to maintain and establish. This is true because complex grammars often require the developer of the grammar to specify every possible combination and subset of entities that are associated with the complex grammar.

If an application is written using a complex grammar to identify an airport, such a grammar must be capable of identifying each airport based upon a variety of possible user input. For example, a complex grammar must be written that will identify John F. Kennedy (JFK) airport in New York City, based upon any number of possible recognized user utterances, such as "JFK airport," "New York state, New York city," or "New York City, N.Y. State," etc. In this approach, a grammar must be written that is very complex in that, for each airport, multiple types of utterances may correspond to any given entry in the list of airports and the grammar must be written to incorporate all possible types of utterances which will identify any given airport. Such a grammar is very complex and is very laborious to generate and to maintain.

In view of the foregoing and other exemplary problems, drawbacks, and disadvantages of the conventional methods and structures, an exemplary feature of the present invention is to provide a method and system that creates a tree representation of hierarchically related data, as well as, to systems and methods for manipulating and searching such a tree representation.

In a first exemplary aspect of the present invention, a method for managing dialogue interaction includes generating a hierarchical tree representation of a set of hierarchical data entities, and identifying a leaf node in the hierarchical tree representation.

In a second exemplary aspect of the present invention, a method of generating a tree includes organizing a set of hierarchical data entities into a hierarchical tree based upon their hierarchical relationship.

In a third exemplary aspect of the present invention, a system for managing dialogue interaction includes a hierarchical data format that includes a plurality of hierarchical data entities, and a dialog interaction manager that manages a dialogue with a user based upon the hierarchical data format.

In a fourth exemplary aspect of the present invention, a system for managing dialogue interaction includes means for generating a hierarchical tree representation of a set of hierarchical data entities, and means for identifying a leaf node in the hierarchical tree representation.

In a fifth exemplary aspect of the present invention, a method for deploying computing infrastructure includes integrating computer-readable code into a computing system. The computer-readable code includes instructions for generating a hierarchical tree representation of a set of hierarchical data entities, and instructions for identifying a leaf node in the hierarchical tree representation.

An exemplary embodiment of the present invention addresses the problems that are involved when specifying, representing, manipulating, communicating and/or searching composite data entities in a concise structured and efficient manner.

An exemplary embodiment of the present invention may be used in a speech and/or natural language understanding system.

An exemplary embodiment of the present invention may be used, for example, in a speech recognition system, a speech decoder system and/or a speech parsing system.

In contrast to the above-mentioned conventional speech recognition systems and natural language understanding systems, the present invention allows for the use of implicit disambiguation mechanisms. In other words, in accordance with the present invention the disambiguation and/or clarification mechanisms may be inferred (implied) based upon the hierarchical data format.

Further, an exemplary embodiment of the present invention automatically generates data structures that are required to perform a search in a recognition state directly from a hierarchical data structure (such as a tree).

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 2 illustrates an exemplary hardware/information handling system 200 for incorporating the present invention therein;

FIG. 3 illustrates a signal bearing medium 300 (e.g., storage medium) for storing steps of a program of a method according to the present invention;

DETAILED DESCRIPTION OF EXEMPLARY EMBODIMENTS OF THE INVENTION

Figure 1:
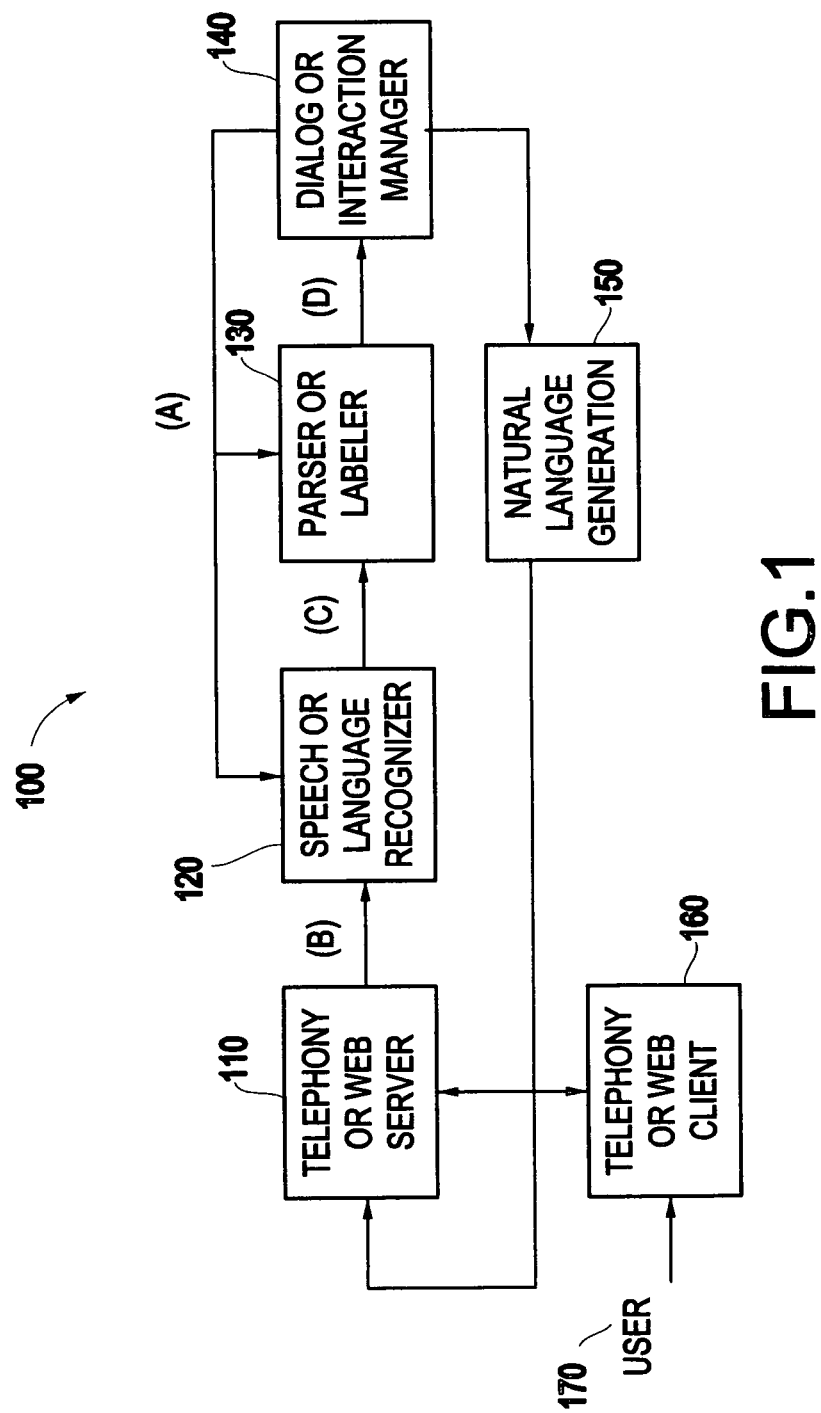
FIG. 1 is a block diagram that illustrates communication links between a user 170 and the natural language understanding system 100 in accordance with an exemplary embodiment of the present invention.

Referring now to the drawings, and more particularly to FIGS. 1-7, there are shown exemplary embodiments of the method and structures of the present invention.

Composite data are data entities that include multiple-attribute structures. Examples of composite data entities include addresses, airport listings, business listings, government listings, product information, and the like.

One example of a format for a composite address data entity may be state name, city name, street name, and street number. A quality of this format is that it is hierarchical and constrained. An instance of such an address data entity is "222 Broadway Street, Springfield, N.Y." in this example.

One exemplary embodiment of the present invention may be used by a speech and natural language understanding system 100 as illustrated, for example, by FIG. 1. FIG. 1 shows a block diagram of an exemplary speech and natural language recognition system 100 in a web/telephony environment.

The block diagram of FIG. 1 illustrates communication links between a user 170 and the natural language understanding system 100. The natural language understanding system 100 includes a telephony/web server 110, a speech recognizer 120, a parser (or labeler) 130 and a dialog manager 140.

One example of an objective of an interaction of a user 170 with the natural language understanding system 100 that is shown in FIG. 1 may be simply to allow the dialog manager 140 to collect a set of information from the user 170 to generate entities.

The entities may be determined based upon the nature of a communication transaction between the natural language understanding system 100 and the user 170, as well as, lists, grammars and models that may be employed by the recognizer 120 and labeler 130 which may communicate dynamically with the dialog manager 140 using link A.

Current automatic speech recognition and natural language understanding applications simplify the problem of representing and identifying by decomposing the complex data structures into simple entities in order to be able to recognize and label complex entities based upon a user's input.

For each of these entities, conventional systems represent and identify the entities in two steps. First, models for a search through a grammar or statistical language model are communicated to the recognizer 120 and the labeler 130 through link A and the user's input is decoded into a text format of recognized utterances using the grammar or statistical language model. This first step is called "recognition and search dataspace representation."

Second, the recognized utterances are constrained and labeled or parsed based upon their meaning. This second step identifies the salient or relevant pieces of information in the recognized utterances. Parsers and labelers typically perform this second step and sometimes it is performed using grammar based decoding.

Conventionally, grammars are employed for both recognition and labeling. As explained above, grammars may be of two types. The first type of grammar is called a "simple entity flat grammar" that may include a simple enumeration of simple entities. In the address example above, four separate simple entity grammars are required to represent a whole space of data having the address format: (1) a street-number grammar, (2) a street-name grammar, (3) a city grammar, and (4) a state grammar. The second type of grammar is called a "complex grammar" that provides an enumeration of the space of values of complex entities. For the above example, a U.S. address complex grammar would enumerate such values.

As mentioned above, complex grammars must be created manually and are laborious to update and maintain. Furthermore, complex grammars need to specify every possible combination and subset of entities that may be associated with a complex entity. Further, disambiguation strategies are extremely difficult to implement and handle using complex grammars.

On the other hand, conventional approaches to speech and natural language recognition systems that use flat (simple) grammars rely on interaction algorithms and methods that sequentially identify values for each of the conforming attributes. While sequential data capturing techniques are appropriate in some applications (like directed dialog voice interfaces), the main drawback of these techniques is that in a data structure with N attributes (e.g., N=4 in the U.S. address example) the interaction must take exactly 4 turns, and currently there is no known way to use this approach to efficiently reduce the number of turns or to efficiently manipulate the grammars. This conventional approach imposes the constraints on the hierarchy in a sequential fashion.

A markup language (or markup code) for a speech recognition system and/or natural language generation system tells a browser what steps are required to be executed in order to achieve an appropriate interaction with a user. A developer is required to write all of the grammars (simple, complex or both) and all of the markup language that will implement the grammars that are written. Such a process is extremely laborious.

In summary, there are many problems and disadvantages in the conventional state of the art. For example, there are a fixed number of interactions for simple entity grammars; there are order and subset problems for complex grammar multiple entities; manual grammar creation and maintenance is intensive; disambiguation is difficult to implement and handle; and directed and mixed initiative modalities require separate crafted grammars.

While the indexing, representation and manipulation of complex records in databases may be achieved through relational databases, such databases are not easily usable directly in speech recognition, speech dialog, web interface or any other form of client/server/user interaction. These relational databases may be useful for database query searches but are not useful for the capturing of complex entity data from a user in an application. Therefore, while some conventional database searching systems rely upon a relational database, conventional speech and natural language search and application systems have been limited to simple enumerative grammars.

An exemplary embodiment of the present invention addresses the problems of specifying, representing, manipulating, communicating and searching hierarchical composite data entities (e.g., data entities that may include multiple-attribute structures) in a concise, structured and efficient manner.

The inventors recognized that if the data that is used by the speech recognition system and/or natural language understanding system is hierarchical, then many advantages may be obtained by organizing that data into a hierarchical structure (or format), such as, for example, a tree.

In this manner, by organizing the hierarchical data into a hierarchical format, the data may be searched and/or processed using very regular mechanisms that drive the interaction with a user. Such mechanisms may include disambiguation and/or clarification mechanisms.

Such a hierarchical format is in stark contrast to the conventional method of using independent and un-correlated grammars.

The present invention, therefore, avoids requiring the development of an elaborate and numerous sets of simple grammars and/or a very lengthy and complex grammar. Further, since the grammars are not used, the markup language that has conventionally been written to implement those grammars also does not have to be written. In this manner, the present invention substantially reduces the amount of labor that is required to implement any particular application that operates upon hierarchical data.

Further, conventional speech recognition systems and natural language understanding systems have had to rely upon explicit disambiguation mechanisms. Such explicit disambiguation mechanisms have taken the form of simple and complex grammars and the implementing markup language that are written to explicitly disambiguate every possible recognized user utterance.

FIG. 2 illustrates a typical hardware configuration of a speech/natural language recognition system 200 for use with the invention and which preferably has at least one processor or central processing unit (CPU) 211.

The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting an information handling system to a data processing network, the Internet, an Intranet, a personal area network (PAN), etc., and a display adapter 236 for connecting the bus 212 to a display device 238 and/or printer 240.

In addition to the hardware/software environment 200 described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include; for example, a RAM contained within the CPU 211, as represented by the fast-access storage for example. Alternatively, the instructions may be contained in another signal-bearing media, such as a magnetic data storage diskette 300 (FIG. 3), directly or indirectly accessible by the CPU 211.

Whether contained in the diskette 300, the computer/CPU 211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

An exemplary embodiment of the present invention provides a method that represents a space of values of hierarchical composite data-structures (e.g., complex data entities) that may be used in speech and natural language understanding applications using trees that provide for easy representation, search, constraining and communication of this space.

In one example of an application in accordance with the present invention, data that identifies the location of airports may be organized based upon the hierarchical relationship of the data into a tree format.

For example, a user may utter "Springfield" and the system may recognize the utterance as corresponding to multiple nodes within the tree. A disambiguation mechanism may be used, if necessary, to infer the possible solution by enumerating the paths through each of the "Springfield" nodes to the resolving leaf nodes and further interact with the user to determine which of those inferred (implied) paths correspond to the airport that the user is seeking to identify. As an example, a disambiguation mechanism may be inferred based upon the hierarchical data format to enumerate each parent node of each path such as "Illinois," "Ohio," "Massachusetts," etc. to allow the user to further determine which path is correct and which will iteratively lead to a specific leaf node that identifies with a specific airport.

For example, after receiving the user utterance "Springfield," the system may then identify all possible paths which include a "Springfield" node and then back up (or down, if necessary) a level in the tree and ask the user to identify a state to disambiguate and/or clarify which "Springfield" corresponds to the correct airport.

In another example, a system may receive a recognized utterance of "New York State." In that instance, the system recognizes that while the parent nodes for "New York State" are identified, the child nodes need to be disambiguated because there are several airports in "New York State." In that example, the system may request the user to utter a county and/or city/town to further disambiguate the path that leads to the desired leaf node. Alternatively, the system may enumerate all of the child nodes and allow the user to select the appropriate child.

An exemplary embodiment of the present invention may rely upon graph interpolation mechanisms and/or tree interpolation mechanisms to perform the above-described disambiguation/clarification processes as well as other processes.

One exemplary tree representation in accordance with the present invention allows for an organized, hierarchical, and restrictive representation that is ideally suited for a recognizer, labeler and parser in a natural language understanding system (e.g., similar to that of FIG. 1) to achieve natural language interaction, representation, and disambiguation. The representation and mechanisms for restricting the space not only allow for the representation of the feature space in the recognizer and the parser, but also allow a dialog manager to efficiently operate on these data-structures.

For an N-order complex data entity, the depth of a tree representing this space for each of its leaves is "N" in accordance with an exemplary embodiment of the present invention. Each node in such a tree corresponds to the value of an attribute, and for a tree of depth N, any path from the root node to a leaf node determines exact values for each of those N attributes.

In a homogeneous tree in accordance with an exemplary embodiment of the present invention, each node of a given depth "M" will share the same attribute name "$A_M$." Nodes may have homonym nodes, which are nodes having identical values (names), but which may have different prefix paths and, thus, different labels. Leaves have associated labels that may be presented to a dialog manager as the values of the attributes associated with such leaves.

Furthermore, with a tree representation in accordance with an exemplary embodiment of the present invention, a dialogue manager may execute restrictive searches (for example, for disambiguation or clarification) using restrictive directives that specify a sub-tree of the original tree. This representation is less restrictive to a grammar in the sense that, because the differentiating elements are clearly identified (e.g., the leaves), it is possible for a user to enunciate only the minimal amount of information that is required to identify each entity. Also this tree representation allows for a free order enunciation of the elements. In other words, the elements are not required to be enunciated in any particular order.

If homonym leafs and homonym nodes are collapsed, the tree may become a graph. Such a representation may be called a homonym graph representation. A homonym graph representation may be useful as a simple global space representation that may be unwrapped into a tree for the purpose of homonym disambiguation.

Disambiguation may be executed simply by identifying a set of homonym leaves and then identifying a set of differentiated paths that produce the set of homonym leaves using an exemplary embodiment of the present invention. The user may be queried by enumerating the set of paths.

A tree representation in accordance with an exemplary embodiment of the present invention may be easily implemented in markup language, graphically, as a data-structure, or any other associated representation.

In summary, the above described tree representation in accordance with an exemplary embodiment of the present invention may provide mechanisms for representing a set of hierarchical homogeneous named entities by means of a tree of depth N; the specification of intermediate or incomplete paths; specifying ambiguous paths (homonym leaves); identifying and communicating of such ambiguous paths; a user interaction for finding values for the N attributes of a data structure by expanding the above representation; basing the representation of hierarchies of grammars that are employed in automatic speech recognition and natural language understanding engines that contain constrained hierarchical knowledge of a domain, and that permit the enumeration of values for any attribute subsets in any order; representing hierarchical heterogeneous bodies of information using a single tree (i.e., not all the nodes of depth N, for every N, share the same attribute name); providing restrictive patterns; and for providing an algebra of restrictive patterns.

EXAMPLE OF A PROBLEM

Consider the following set of addresses of a particular geography in the United States of a set of offices of a company called "Example Corp.":

Office A: Elmwood Street, Hawthorne, N.Y., US
Office B: Broadway Street, Hawthorne, N.Y., US
Office C: Broadway Street, Nyack, N.Y., US
Office D: Fifth Avenue, Nyack, N.Y., US
Office E: Fifth Avenue, Manhattan, N.Y., US
Office F: Broadway Street, Manhattan, N.Y., US
Office G: Madison Avenue, Albany, N.Y., US
Office H: Park Avenue, Albany, N.Y., US The above set of addresses represents a collection of records, each of which is a structure that includes named entities: a street name, a town or city name, a state name, and the country. In addition, a label identifies each record by its office name. This is called the label or annotation of the record. The above set is heterogeneous because not all the records include exactly the same set of attributes (e.g., Hawthorne is a town, while Albany is a City, and Manhattan is a Borough).

In a speech recognition application, if a user wants to identify a particular office, the user should give enough address information to produce an unambiguous identification of the record. This may be achieved in a directed dialog modality. For example, consider the following interaction:

System: Which country?
User: United States
System: Which state?
User. New York
System: Which town or city?
User: Hawthorne
System: Which street?
User: Broadway street
System: The office you're looking for is Office B, in Broadway St. Hawthorne N.Y. USA.

In conventional speech systems, there are two approaches to representing the above set of complex named entities. The first approach uses an enumerative complex grammar and the second approach uses a union of a disjoint set of sub-grammars or flat grammars (e.g., a grammar for states, a grammar for cities, and a grammar for street names).

The following represents the above set of addresses as an enumerative grammar and annotations denoting the office name:

```
<ExampleCorp> = Elmwood Street, Hawthorne, NY, US {A}
  | Broadway Street, Hawthorne, NY, US {B}
  | Broadway Street, Nyack, NY, US {C}
  | Fifth Avenue, Nyack, NY, US {D}
  | Fifth Avenue, Manhattan, NY, US {E}
  | Broadway Street, New York, NY, US {F}
  | Madison Avenue, Albany, NY, US {G}
  | Park Avenue, Albany, NY, US {H};
```

The following represents the above set of addresses employing a disjointed set of grammars:

```
<ExampleCorp> = $Street $Town NY US;
<Street> = Broadway {B,C,F}| Fifth {D,E} | Elmwood {A} |
    Madison {G} | Park {H};
<Town> = Albany | Manhattan | Hawthorne | Nyack;
```

The following is an example of an interaction scenario in a complex grammar environment:
System: Which Address?
User: Broadway Street NY United States
System: The office you are looking for is Office B.

While the interaction based on a complex grammar is more concise than an interaction based on flat grammars, building and maintaining complex grammars is substantially more laborious. Also, complex grammars are sensitive to input utterance word ordering.

Therefore, problems with conventional systems include: a need for explicit ambiguity resolution grammars because ambiguous leaves require explicit disambiguation grammars; these system are unrestrictive (e.g., "Fifth Avenue, Nyack" is syntactically permissible, but is a semantically incorrect utterance); heterogeneous sources are hard to integrate; enumerative grammars are inefficient and expensive; sufficient attribute subsets are not allowed; a fixed order is required because a variable order is exponentially difficult; a fixed number of interactions is required (for simple entity grammars); and manually intensive grammar creation and maintenance is required.

In stark contrast to these conventional systems and methods, an exemplary embodiment of the present invention provides a system and method that represents a set of labeled hierarchical complex named entities using a hierarchical tree. Each record in the list of labeled hierarchical complex named entities is associated with a leaf in the tree. Each leaf in the hierarchical tree is associated with its original label.

Each leaf i has a depth Di and, if all the leaves have the same depth and all the nodes j with depth Dj are associated to a single type of data, then the tree is said to be homogeneous. If any one of these conditions is not met, the tree is heterogeneous.

A path from a root node to a leaf node is an ordered set of connected nodes starting from the root node to the leaf node. An unambiguous sub-path is a subset of nodes of a path to a leaf node that exists in no other leaf node. A leaf name is an unambiguous sub-path if and only if no other leaf shares the same name (i.e., there are no homonyms).

An exemplary embodiment of the present invention represents a domain using the hierarchical tree described above, and allows for the efficient determination and identification of an unambiguous sub-path, homonyms, and disambiguation interactions.

As a tree, each node contains a "tag" attribute that corresponds to the attribute name of that node (for example "City"). A "tag.name" attribute has the value of such an attribute (for the same example, "Albany"). In addition, if a node is a leaf node, the attribute "tag.label" will also be associated to the node, and the value of the node will be the specific entity label.

Figure 4:
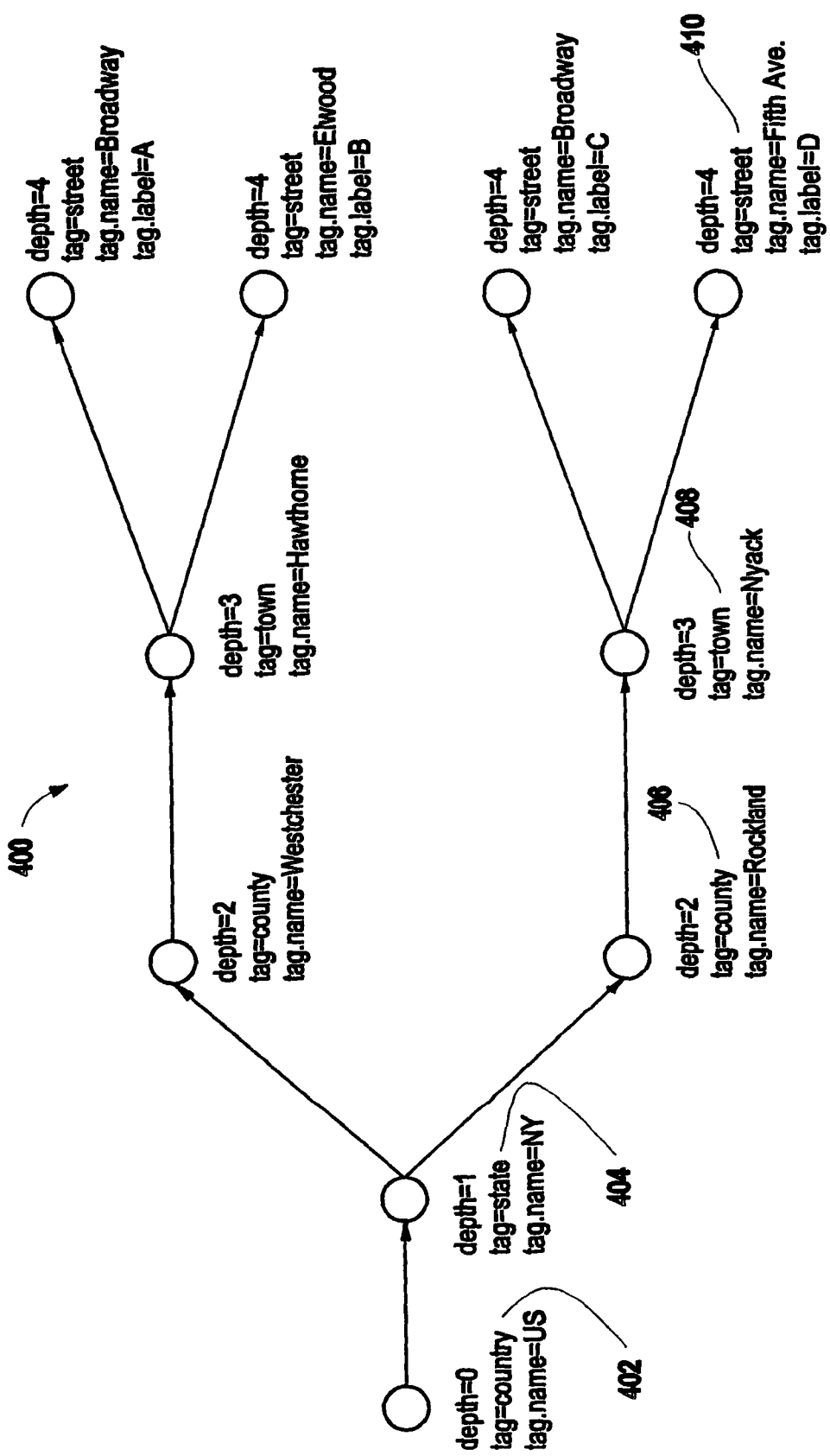
FIG. 4 illustrates a hierarchical data model representation 400 of a homogeneous complex named entity domain in accordance with an exemplary embodiment of the present invention.

FIG. 4 illustrates a hierarchical data model representation 400 of a homogeneous complex named entity domain in accordance with an exemplary embodiment of the present invention. In particular, FIG. 4 illustrates a tree 400 of a subset of the original domain that is described above. In this illustration only a homogeneous subset is illustrated where the attributes or tags are: country 402, state 404, county 406, town 408, and street 410.

A markup representation of a tree in accordance with an exemplary embodiment of the present invention includes tags whose names correspond to the values of the tag attributes in a corresponding tree representation. Then for each tag, the attribute name carries a value equal to the value of "tag.name" in the corresponding tree representation. For leaf nodes, the attribute label has the same value as the "tag.label" in the corresponding tree representation.

In extended markup language (XML markup), the complete (heterogeneous) hierarchical tree 400 is:

```
<tree name="Offices of the Example Corp.">
<country name ="US">
    <statename ="NY">
        <county name ="Westchester">
            <town name ="Hawthorne">
                <street name ="Broadway" label ="A" >
                <street name ="Elmwood" label ="B" >
            </town>
        </county>
        <county name ="Rockland">
            <town name ="Nyack">
                <street name ="Broadway" label="C" >
                <street name ="Fifth avenue" label="D" >
            </town>
        </county>
        <city name="NYC">
            <borough name="Manhattan">
                <street name="Fifth Avenue" label="E" >
                <street name="Broadway" label="F" >
            </borough>
        </city>
        <city name="Albany">
            <street name="Madison" label="G" >
            <street name="Park" label="H" >
        </city>
    </state>
</country>
        </tree>
```

Another exemplary embodiment of the present invention, in combination with the above representations, provides a method to restrict the search, or labeling of a domain into a smaller connected subset of nodes (i.e., a sub-tree). To achieve this, a restrict label is used to indicate an explicit sub-tree, a path, a sub-path, or simply a node that reduces the search space.

Specifically, restrictive directive formations may include an explicit, an implicit, or an algebraic restrictive directive formation. An explicit restrictive directive formation provides a complete sub-path from root to node set {Ni . . . Nj} and the sub-tree of all the children and descendants of this set is the sub-domain. An implicit restrictive directed formation does not provide a path from a root to node Ni. Rather, the prefix path is assumed (or implied). An algebraic restrictive directive formation first defines a set of operands (which are other trees or sub-trees) and then, using an operator attribute (see example below) manipulates these sets using set operations (union, complement, intersection) in a reverse polish notation way.

The following is an example of an explicit path restrictive directive:

```
<restrict tree="Offices of the Example Corp." name="Outlets">
<country name="US">
    <state name="NY">
        <county name="Westchester"/>
```

```
        <county name="Nyack"/>
   </state>
</country>
        </restrict>
```

The following is an example of an implicit path restrictive directive:

```
<restrict tree="Offices of the Example Corp." name="Flagship">
<street name="Fifth Avenue" label="E"/>
     </restrict>
```

The following is a first example of an algebraic restrictive directive:

```
<restrict tree="Offices of the Example Corp." name="Set Alpha"
operator=Union>
     <operand name="Outlets"/>
     <operand name="Flagship"/>
        </restrict>
```

The following is another example of an algebraic restrictive directive:

```
<restrict tree="Offices of the Example Corp." name="Set Beta"
operator=Complement>
        <operand name="Set Alpha"/>
     </restrict>
```

Figure 5:
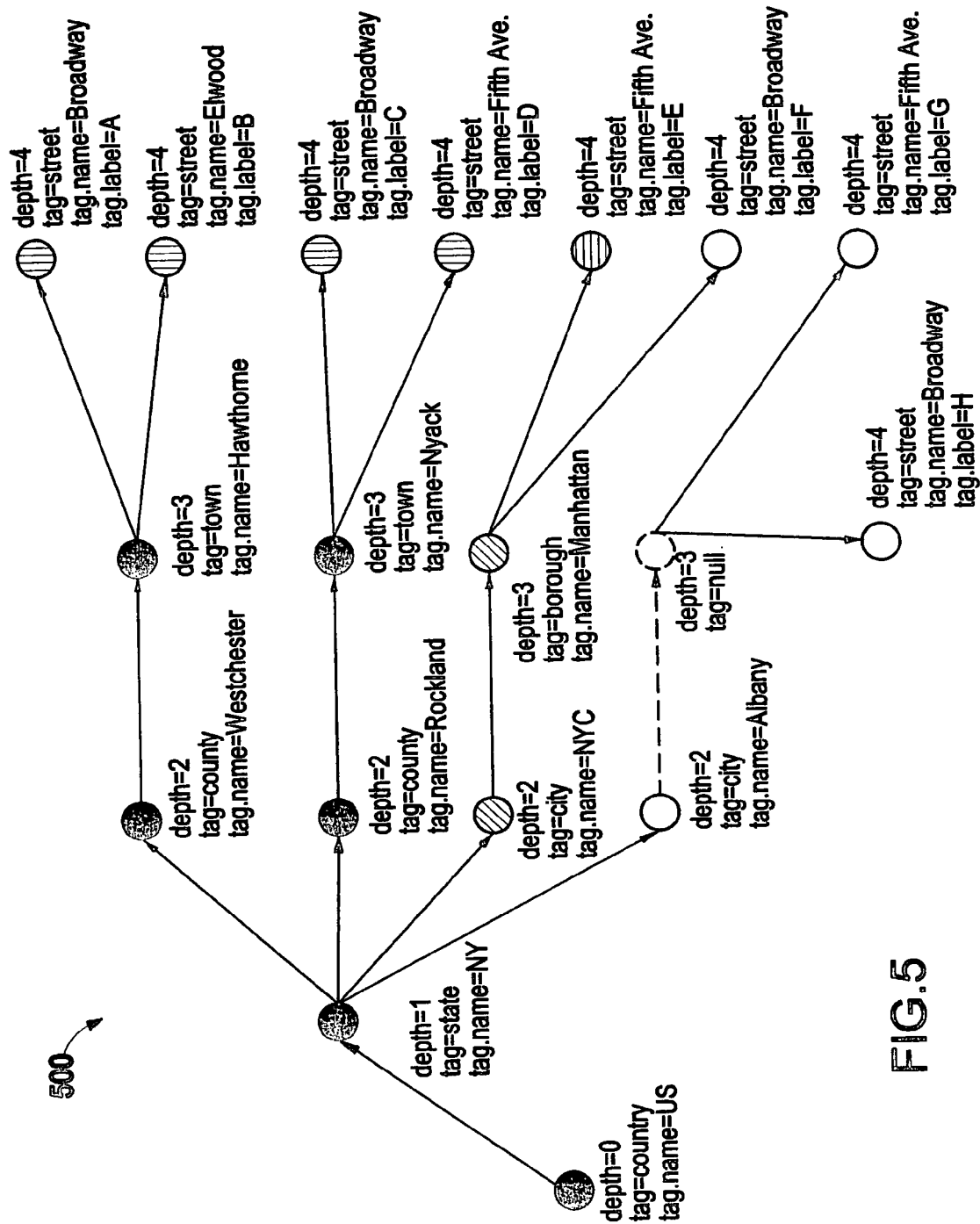
FIG. 5 illustrates a hierarchical data model representation 500 of a heterogeneous complex named entity domain in accordance with an exemplary embodiment of the present invention.

FIG. 5 illustrates a hierarchical data model representation 500 of a heterogeneous hierarchical complex named entity domain in accordance with an exemplary embodiment of the present invention. FIG. 5 illustrates a complete heterogeneous tree 500 of the Example Corp. domain described above. Since FIG. 5 illustrates a heterogeneous tree, a null node should be used, since not all the nodes of depth N have the same "tag.name."

The paths of the restrictive directive called "Outlets" (described above) are illustrated with solid black nodes. The leaves with vertical stripes represent the permissible labels of this restrictive directive. In horizontal stripes is a leaf node corresponding to a "Flagship" directive. A set "Alpha," corresponds to a union of "Outlets" and "Flagship," and include all of the non-white nodes, while the set "Beta," described above corresponds to the non-colored nodes and their prefixes.

While the restrictive directive is described above as being used to identify sub-trees in a tree domain as an input mechanism, restrictive directives may also be used in output mechanisms.

The following description provides an example of how natural language generation may be mixed with tree representations and restrictive directives to identify sets of attributes that aid in disambiguation situations in accordance with the present invention.

Figure 6:
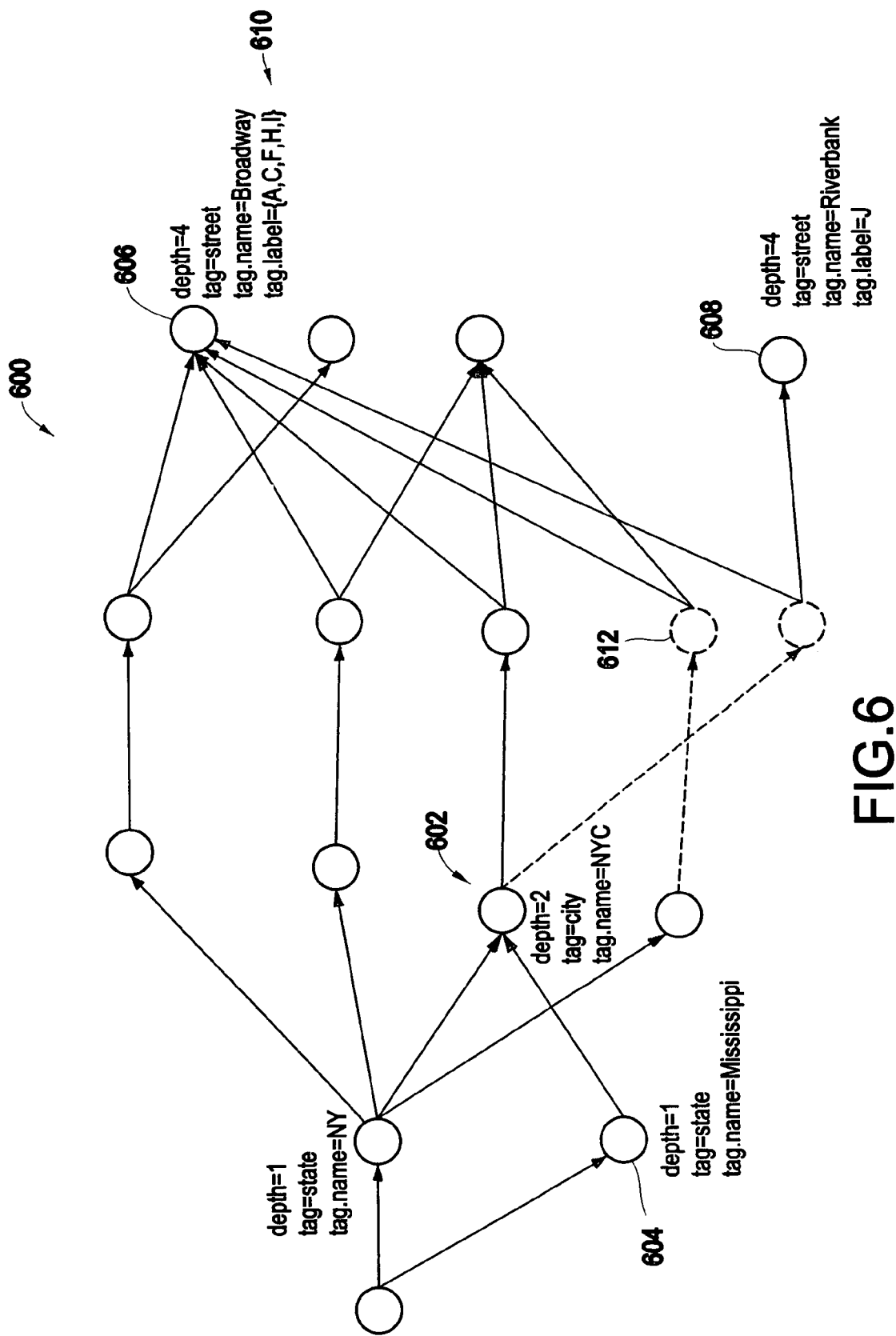
FIG. 6 illustrates a homonym graph 600 of a heterogeneous complex named entity domain in accordance with an exemplary embodiment of the present invention.

FIG. 6 illustrates a homonym graph 600 of a heterogeneous complex named entity domain in accordance with an exemplary embodiment of the present invention. FIG. 6 illustrates the homonym graph representation 600 of the domain 500 of FIG. 5.

In this particular case, the homonym leaves (leaves with the same "tag.name" value) are collapsed. In addition, the city "New York City" 602 has been added in the state of "Missisippi" 604 (see the office with label I) 606, in order to illustrate that intermediate nodes may also collapse their homonym nodes. For this example, "New York City" 602 also has a "Broadway" street node 606 and a "Riverbank" street office node 608. In this case, the "Broadway" homonym leaf 606 has a list of labels in its "tag.label" attribute 610. Also note how a new null node 612 was added for the office label I.

An example of a communication transaction in which the graph that is illustrated by FIG. 6 is used in a natural language understanding system to disambiguate follows:

System: Which office?

User: The one in Broadway Avenue

System: Select one: Hawthorne, Nyack, Manhattan or Albany?

User: Nyack

System: The office in Broadway avenue, in Nyack, N.Y., is office number C

In this example, the system identifies a set of labels {A,C, F,H,I} when the node 606 of "Broadway" is mentioned in the first interaction turn. Because "Broadway" 606 is a homonym node, disambiguation needs to take place, and, thus, a backoff to depth 3 is executed: note how the null nodes backed off another level to a non-null node.

In accordance with an exemplary embodiment of the present invention, trees and grammars are efficiently organized in a hierarchy.

In an exemplary embodiment of the invention, each layer of the hierarchy is associated with an attribute. A Tree/Grammar of order M has M layers (e.g., levels), and thus M attributes where M is the number of layers that need to be traversed in order to reach a leaf.

In an exemplary embodiment of the invention, leaves are terminal nodes and specify a "complete path." In a complete path all of the M attributes have values. A complete path may be expressed as a list of M attribute value pairs. An unambiguously completable path contains a subset of the M attributes, including one non-ambiguous leaf node, which can be uniquely traced back to the root node, thus forming a completable path.

In another exemplary embodiment of the present invention, a "path prefix" specifies an incomplete path from the root to a given non-leaf node. A path-prefix or path segment of order N (N<M) may be uniquely specified by a sequence of attribute values for each successive node layer.

In yet another exemplary embodiment of the present invention, nodes may have duplicate names within the same hierarchy level, however, their path prefixes should differ in order to be distinguishable. Two leaf nodes are synonyms if they share the same name, but different prefixes.

In a further exemplary embodiment of the present invention, if a leaf node has a unique value, then its complete path may be unambiguously inferred.

In another exemplary embodiment of the present invention, if a leaf node has at least one duplicate value or synonym (R>1 synonyms), and R denotes the duplicity order, then there may be as many as R distinguishable path prefixes.

With an exemplary embodiment of the present invention, a set of R distinguishable path prefixes defines a sub-tree. In a disambiguation task, this sub-tree is called a disambiguation sub-tree of order R. When disambiguating a set of synonyms of order R, their set of distinguishable prefix paths defines a disambiguation sub-tree. A disambiguation strategy finds and utilizes the attribute that distinguishes them.

An exemplary embodiment of the present invention provides a method for decoding using a grammar as follows:
hierarchical grammar (1,2) is sent to the decoder. After capturing the user's input,
if the decoder identifies at least a terminal node then determine the set of
distinguishable paths from such terminal. If the user's input only provides an
incomplete path send to DM/Voice Browser. Prompt user with a disambiguation
prompt and activate only disambiguative subtree.
Prompt #1
Input is: (a) complete
a.1 complete and unambiguous
a.2 complete but R confusable
(b) incomplete
b.1 subpath is incomplete and unambiguous
b.2 subpath is incomplete and ambiguous Another exemplary embodiment of the present invention provides a method for performing constrained searches using sub-tree templates or restrictive directives.

An exemplary embodiment of the present invention provides an algebra of such restrictive directives.

Another exemplary embodiment of the present invention provides a method for graph representation of homonym trees.

Yet another exemplary embodiment of the present invention provides a method for decoding any subset of attributes, in any order based on the graph representation mentioned above.

Figure 7:
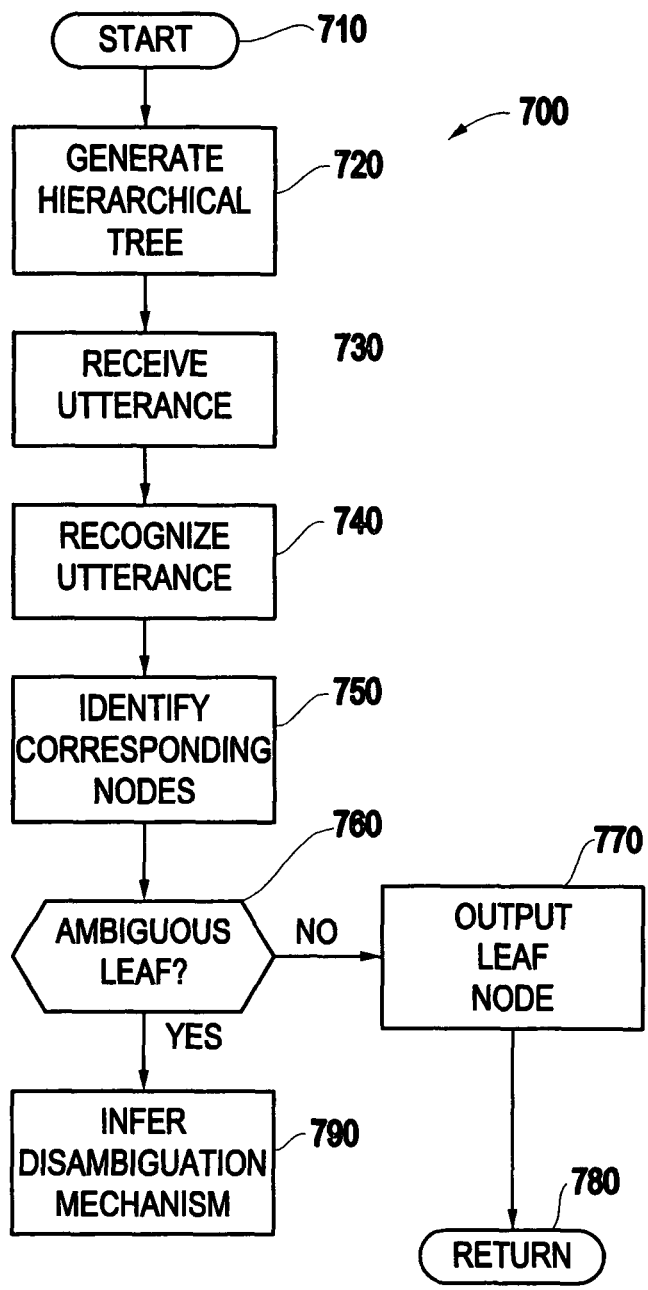
FIG. 7 illustrates a flowchart of an exemplary control routine 700 in accordance with the present invention.

FIG. 7 illustrates a flowchart for a control routine 700 in accordance with an exemplary embodiment of the present invention. The control routine starts at step 710 and continues to step 720. In step 720, the control routine generates a hierarchical tree and continues to step 730. In step 730, the control routine initiates a dialog with a user by receiving an utterance from a user and continues to step 740. In step 740, the control routine recognizes the utterance and continues to step 750 where the control routine identifies all nodes that correspond to the recognized utterance. The control routine then continues to step 760 where the control routine determines whether there is any ambiguity in the particular leaf that corresponds to the recognized utterance. If, in step 760, the control routine determines that there is no ambiguity between leaf nodes, then the control routine outputs the identified leaf node in step 770 and continues to step 780 where the control routine returns control to the routine that called the control routine of FIG. 7.

If, however, in step 760, the control routine determines that there are ambiguous leaves that correspond to the recognized utterance, then the control routine continues to step 790. In step 790, the control routine infers a disambiguation mechanism based upon the hierarchical nature of the tree and returns to step 730 where another utterance is received in response to the inferred disambiguation mechanism.

It is understood by those of ordinary skill in the art that step 720 of generating the hierarchical tree may not be necessary as the hierarchical tree may have already been generated. In that instance, step 720 may be omitted.

It is also understood by those of ordinary skill in the art that the disambiguation mechanism that is inferred by step 790 may include any of the disambiguation mechanisms that have been described above, as well as other disambiguation mechanisms as long as the appropriate mechanism is inferred based upon the structure of the hierarchical format of the tree.

Further, while the above description has been provided in relation to speech and/or natural language systems, one of ordinary skill in the art understands that the hierarchical tree and the dialog interaction management that utilizes such a hierarchical tree is useful in any type of dialog, such as in a chat interaction, a speech recognition system, a natural language understanding system and the like.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method for managing dialogue interaction involving a computer, to allow a user to complete information for a composite data entity, said method
operating on a hierarchical representation of a set of composite data entities and storing said hierarchical representation in a memory of the computer, the hierarchical representation comprising a plurality of levels, each level corresponding to a respective attribute of the composite data entities and each level comprising one or more nodes, each node comprising a value for the respective attribute such that each composite data entity is represented by a path through the hierarchical representation to a leaf node, the method comprising:
with a processor of the computer, iteratively performing acts, comprising, for each iteration:
with a component executing on the computer, generating one or more prompts to the user based on the hierarchical representation, the one or more prompts requesting user input that differentiates between two or more paths, each of the two or more paths being a path through the hierarchical representation to a leaf node of the plurality of leaf nodes in the hierarchical representation;
recognizing in an utterance received from the user in response to the one or more prompts, one or more recognized values, each recognized value corresponding to a value of a node in the hierarchical representation;
identifying a subset of the paths in said hierarchical representation, each path in the subset having a node with a value corresponding to each of the one or more recognized values;
when the subset of paths ambiguously corresponds to a plurality of paths from a root node of the hierarchical representation to one or more of the leaf nodes:
selecting a disambiguative portion of the hierarchical representation, the disambiguative portion comprising the subset of paths; and
for a subsequent iteration, restricting generation, by the component, of the one or more prompts to the user, the component being restricted so as to generate the one or more prompts using the disambiguative portion of the hierarchical representation,
wherein:
the hierarchical representation comprises a tree; and
the method further comprises determining whether the subset of paths ambiguously corresponds to a plurality of paths by determining whether a first set of nodes unambiguously corresponds to a single leaf node or ambiguously corresponds to a set of leaf nodes, the first set of nodes comprising each node in the hierarchical representation having a value corresponding to a value of the one or more recognized values.

2. The method of claim 1, wherein generating one or more prompts comprises querying a user by enumerating the subset of paths.

3. The method of claim 1, wherein generating one or more prompts comprises querying a user to elicit a response differentiating between paths within the disambiguative portion.

4. The method of claim 1, wherein restricting generation by the component comprises issuing a restrictive directive.

5. The method of claim 1, wherein said dialogue interaction comprises one of recognizing speech, understanding a natural language, decoding speech, and parsing speech.

6. The method of claim 1, wherein generating the hierarchical representation of a set of composite data entities and storing said hierarchical representation in a memory of the computer comprises storing the representation in a markup language.

7. The method of claim 1, wherein the hierarchical representation comprises a number M of levels and the generating one or more prompts comprises generating fewer than M−1 prompts to identify the unambiguous path.

8. A system involving a computer for managing interaction during a dialogue, said system comprising:
   a memory storing a hierarchical representation of a plurality of composite data entities, the hierarchical data representation comprising a tree comprising a plurality of nodes, the hierarchical representation comprising a plurality of levels, each level corresponding to a respective attribute of the composite data entities, and each node being associated with a level of the plurality of levels, and each node being associated with a value forming a portion of a composite data entity and each path through the hierarchical representation defining values that form a composite data entity of the plurality of composite data entities such that each composite data entity is represented by a path through the hierarchical representation to a leaf node; and
   a speech recognition mechanism for recognizing in an input utterance one or more of the values associated with nodes of the plurality of nodes regardless of an order in which the one or more values occur in the dialogue;
   a dialogue interaction manager coupled to the speech recognition mechanism, said dialogue interaction manager identifying at least a node in said hierarchical representation having a value recognized in the input utterance or a path through said hierarchical representation that comprises one or more nodes having values recognized in the input utterance, said dialogue interaction manager further managing a dialogue with a user based upon the hierarchical representation to request from said user further utterances that contain values to complete information missing for one of said composite data entities, the dialogue comprising a plurality of requests, wherein:
      each request in the dialogue is selected to differentiate between a plurality of paths through a sub-portion of the hierarchical representation, each of the paths in the plurality of paths containing at least one node with a value previously recognized in the input utterance or a received utterances of the further utterances in the dialogue,
      the sub-portion is selected for each request of the plurality of requests to exclude portions of the hierarchical representation for which there is no ambiguous path to a node with a value previously recognized in the input utterance or the received utterances of the further utterances in the dialogue,
      the sub-portion is communicated to the speech recognition mechanism for recognizing one or more of the values associated with nodes in the sub-portion in an input received in response to the request; and
      the dialogue interaction manager determines whether the sub-portion ambiguously corresponds to a plurality of paths by determining whether a first set of nodes unambiguously corresponds to a single leaf node or ambiguously corresponds to a set of leaf nodes, the first set of nodes comprising each node in the sub-portion having a value corresponding to a value of the one or more recognized values.

9. The system of claim 8, wherein:
   the speech recognition mechanism comprises a dialogue parser in communication with said dialog interaction manager, and
   the dialogue parser and the dialog interaction manager each receive a restrictive directive identifying the sub-portion of the hierarchical representation.

10. The system of claim 8, further comprising one of a telephone server and a web server in communication with said system.

11. The system of claim 8, wherein said dialogue interaction manager comprises a disambiguation mechanism.

12. The system of claim 11, wherein said disambiguation mechanism comprises a restrictive directive.

13. The system of claim 12, wherein said restrictive directive comprises one of an explicit restrictive directive, an implicit restrictive directive, and an algebraic restrictive directive.

14. The system of claim 11, wherein a characteristic of said disambiguation mechanism is inferred based upon a dialog with a user and the hierarchical data format.

15. The system of claim 8, wherein said composite data entities comprise hierarchical data entities comprising multiple-attribute data structures.

16. The system of claim 8, wherein said hierarchical representation comprises a hierarchical data format comprising one of homonym nodes and a homonym graph.

17. A system for managing dialogue interaction comprising:
   means for storing a hierarchical tree representation of a set of composite data entities in a computer, the hierarchical representation comprising a plurality of levels, each level corresponding to a respective attribute of the composite data entities, the hierarchical representation comprising a plurality of nodes, each node being associated with a level of the plurality of levels, and each node being associated with a value forming a portion of a composite data entity and each path through the hierarchical representation defining values that form a composite data entity of the plurality of composite data entities such that each composite data entity is represented by a path through the hierarchical representation to a leaf node;
   means for receiving an utterance from a user in a computer;
   means for recognizing the utterance; and
   means for identifying at least one of a leaf node in the hierarchical tree representation and a path through said hierarchical tree representation that corresponds to the recognized utterance and for permitting a user to complete any information that might be missing for a composite data entity related to said utterance by requesting from said user further utterances that contain values to complete information missing for one of said composite data entities, wherein:
      each request in the dialogue is selected to differentiate between a plurality of paths through a sub-portion of the hierarchical tree representation, each of the paths in the plurality of paths containing at least one node with a value previously recognized in the input utterance or received utterances of the further utterances in the dialogue, the request being made based on finding an attribute that distinguishes among paths of the plurality of paths such that a path is unambiguously identified with fewer requests than levels of the hierarchical representation spanned by the paths of the plurality of paths, and the sub-portion is selected for each request to exclude portions of the hierarchical representation for which there is no ambiguous path to a node with a value previously recognized in the input utterance or the further utterances in the dialogue; and the sub-portion is communicated to the means for recognizing the utterance for recognizing one or more of the values associated with nodes in the sub-portion in an input received in response to the request;

it is determined whether the subset sub-portion ambiguously corresponds to a plurality of paths by determining whether a first set of nodes unambiguously corresponds to a single leaf node or ambiguously corresponds to a set of leaf nodes, the first set of nodes comprising each node in the hierarchical representation having a value corresponding to one or more recognized utterances.

18. A non-transitory computer storage device comprising computer-readable code that, when executed in a computing system, performs a method of identifying a named entity, the computer-readable code comprising:

instructions for at least one of generating or storing a hierarchical tree representation of a set of data entities in a computer, the hierarchical representation comprising a plurality of levels, each level corresponding to a respective attribute of the composite data entities, the hierarchical representation comprising a plurality of nodes, each node being associated with a level of the plurality of levels, and each node being associated with a value forming a portion of a composite data entity and each path through the hierarchical representation defining values that form a composite data entity of the plurality of composite data entities such that each composite data entity is represented by a path through the hierarchical representation to a leaf node;

instructions for receiving a plurality of utterances from a user of a computer;

instructions for recognizing recognized values in the plurality of utterances;

instructions for identifying, at each of a plurality of times in response to utterances of the plurality of utterances received at the time, one or more paths, through the hierarchical representation, each of the one or more paths comprising nodes each having a value corresponding to a recognized value at the time;

instructions for determining whether the one or more paths ambiguously corresponds to a plurality of paths by determining whether a first set of nodes unambiguously corresponds to a single leaf node or ambiguously corresponds to a set of leaf nodes, the first set of nodes comprising each node in the hierarchical representation having a value corresponding to a value of the one or more recognized values;

instructions for generating one or more prompts to the user based on a specified portion of the hierarchical representation, the one or more prompts requesting user input that distinguishes between paths of the one or more paths in accordance with a disambiguation strategy that finds and utilizes an attribute of the plurality of attributes that distinguishes among the one or more paths;

instructions for, when the one or more paths ambiguously corresponds to a plurality of paths from a root node of the hierarchical tree representation to one or more leaf nodes, iteratively:

selecting a disambiguative portion of the hierarchical tree representation based on the plurality of paths; and providing an indication of the disambiguative portion of the hierarchical tree representation as the specified portion for the instructions for generating one or more prompts, the indication comprising a restrictive directive, whereby an unambiguous path through the hierarchical tree representation to the leaf node is identified, the path indicating complete information for a hierarchical data entity.

* * * * *